United States Patent
Stark

(10) Patent No.: US 11,187,070 B2
(45) Date of Patent: Nov. 30, 2021

(54) DOWNHOLE DEPTH EXTRACTION USING STRUCTURED ILLUMINATION

(71) Applicant: Halliburton Energy Services, Inc., Houston, TX (US)

(72) Inventor: Daniel Joshua Stark, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/626,505

(22) PCT Filed: Jan. 31, 2019

(86) PCT No.: PCT/US2019/016045
§ 371 (c)(1),
(2) Date: Dec. 24, 2019

(87) PCT Pub. No.: WO2020/159513
PCT Pub. Date: Aug. 6, 2020

(65) Prior Publication Data
US 2021/0115781 A1    Apr. 22, 2021

(51) Int. Cl.
*E21B 47/002* (2012.01)
*H04N 5/225* (2006.01)
*H04N 5/247* (2006.01)

(52) U.S. Cl.
CPC ......... *E21B 47/002* (2020.05); *H04N 5/2256* (2013.01); *H04N 5/247* (2013.01); *H04N 2005/2255* (2013.01)

(58) Field of Classification Search
CPC .... E21B 47/002; E21B 47/113; E21B 47/114; H04N 5/2256; H04N 2005/2255;
(Continued)

(56) References Cited

U.S. PATENT DOCUMENTS 5,652,617 A    7/1997  Barbour
6,697,102 B1   2/2004  Olsson et al.
(Continued)

FOREIGN PATENT DOCUMENTS

WO    2012134147 A1    10/2012
WO    2019139614 A1    7/2019

OTHER PUBLICATIONS

Watanabe, et al., 955-fps Real-time Shape Measurement of a Moving/Deforming Object using High-speed Vision for Numerous-point Analysis, Apr. 2007, 2007 IEEE International Conference on Robotics and Automation, Roma, Italy, 10-14 (Year: 2007).*
(Continued)

*Primary Examiner* — Jayanti K Patel
*Assistant Examiner* — Christopher Kingsbury Glover
(74) *Attorney, Agent, or Firm* — Gilliam IP PLLC

(57) ABSTRACT

An apparatus includes a tool body and a structured illumination device attached to the tool body, wherein the structured illumination device includes a light source and a light filter mask to generate a light pattern. The apparatus also includes a subsurface camera system attached to the tool body, wherein the subsurface camera system comprises a plurality of cameras. The apparatus also includes a processor and a machine-readable medium having program code executable by the processor to cause the apparatus to acquire an image of a feature using the subsurface camera system and determine a three-dimensional position of the feature based on the image, wherein the feature is illuminated by the light pattern.

20 Claims, 10 Drawing Sheets

(58) Field of Classification Search
CPC ... G01N 2021/9544; G01N 2021/9548; G01N 2201/0635; G01N 21/954; G02B 23/2461; G03B 37/005
See application file for complete search history.

(56) References Cited

U.S. PATENT DOCUMENTS

| | | | | |
|---|---|---|---|---|
| 10,609,266 | B2* | 3/2020 | Tilleman | G02B 13/06 |
| 2004/0207394 | A1 | 10/2004 | Harthorn et al. | |
| 2010/0295941 | A1 | 11/2010 | Jeong et al. | |
| 2012/0169841 | A1* | 7/2012 | Chemali | E21B 47/002 348/36 |
| 2014/0139639 | A1* | 5/2014 | Wagner | G06T 17/00 348/46 |
| 2014/0305732 | A1* | 10/2014 | Tulett | G01V 1/0475 181/112 |
| 2015/0167447 | A1* | 6/2015 | Tjhang | E21B 47/18 348/85 |
| 2015/0247950 | A1* | 9/2015 | Perkins | G01J 3/0227 250/254 |
| 2016/0205378 | A1* | 7/2016 | Nevet | H04N 13/257 348/47 |
| 2018/0365847 | A1* | 12/2018 | Miyata | G06T 7/13 |
| 2020/0065985 | A1* | 2/2020 | Gupta | G06T 7/521 |

OTHER PUBLICATIONS

PCT Application Serial No. PCT/US2019/016045, International Search Report, dated Oct. 30, 2019, 4 pages.
PCT Application Serial No. PCT/US2019/016045, International Written Opinion, dated Oct. 30, 2019, 7 pages.
Frantz, "High Contrast Imaging Through Scattering Media Using Structured Illumination Fourier Filtering", Lund University, Division of Combustion Physics, 2017, 51 pages.
Geng, "Structured-Light 3D Surface Imaging: A Tutorial", IEEE Intelligent Transportation System Society, 2010, 33 pages.
Chen, et al., "Structured-Illumination-Based Lensless Diffractive Imaging and Its Application to Optical Image Encryption", Optics Communications vol. 285, 2012, pp. 2044-2047.
Lai, et al., "Coded Aperture Structured Illumination Digital Holographic Microscopy for Superresolution Imaging", Optical Society of America, Optics Letters vol. 43 No. 5, Mar. 2018, 4 pages.
Martinez-Leon, et al., "Compressive Holography With Phase-Structured Illumination", 2015 14th Workshop on Information Optics (WIO), IEEE, Kyoto, Jun. 2015, 3 pages.
Nguyen, et al., "Three-Dimensional Facial Digitization Using Advanced Digital Image Correlation", Optical Society of America, Applied Optics vol. 57 No. 9, Mar. 2018, 9 pages.
Saxena, et al., "Structured Illumination Microscopy", Advances in Optics and Photonics 7, 2015, pp. 241-275.

* cited by examiner

DOWNHOLE DEPTH EXTRACTION USING STRUCTURED ILLUMINATION

BACKGROUND

The disclosure generally relates to the field of imaging and more particularly to subsurface imaging.

The physical integrity of a subsurface system contributes to reliability in resource extraction operations and formation evaluation. The subsurface system can include pipes, casing, equipment, and sensors in a borehole. The subsurface system can also include the borehole wall and branch points of the borehole. The physical integrity of the subsurface system can be evaluated based on the detection and characterization of features in the subsurface system. Such features can include bumps from trapped debris, pitting from corrosion, constrictions due to material buildup, and grooves from physical impacts.

BRIEF DESCRIPTION OF THE DRAWINGS

Embodiments of the disclosure may be better understood by referencing the accompanying drawings.

DETAILED DESCRIPTION

Figure 1:
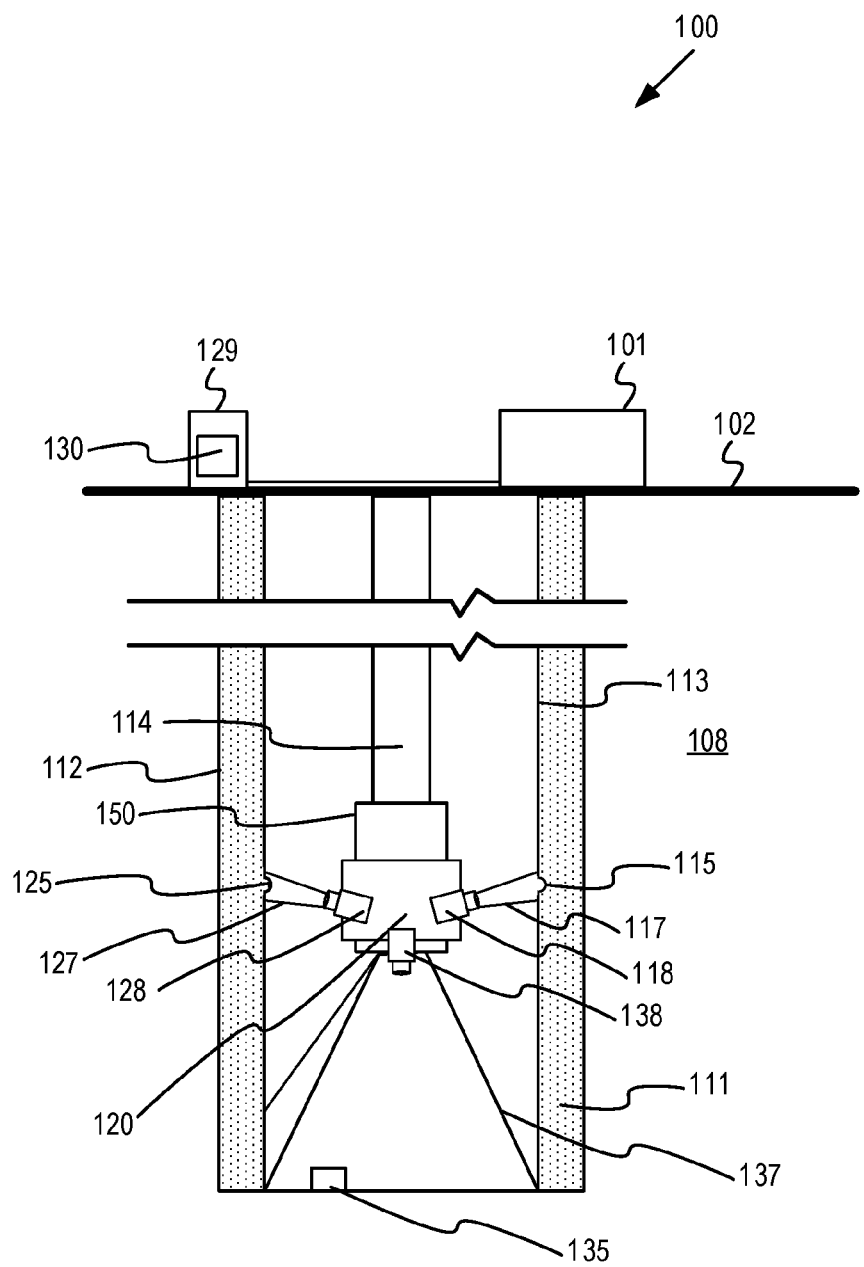
FIG. 1 is an elevation view of an onshore well system operating a wireline tool that includes a structured illumination (SI) device.

The description that follows includes example systems, methods, techniques, and program flows that embody embodiments of the disclosure. However, it is understood that this disclosure can be practiced without these specific details. For instance, this disclosure refers to black and white patterns. Aspects of this disclosure can instead be applied to other color patterns such as red and blue color patterns or color patterns having at least three colors, wherein both black and white can be colors in the context of this application. This disclosure also refers to a pair of cameras as a circumferentially distributed camera system. Circumferentially distributed camera systems can include other numbers of cameras, such as three cameras, four cameras, etc. In other instances, well-known instruction instances, protocols, structures and techniques have not been shown in detail in order not to obfuscate the description. A "depth" refers to a depth of vision except in the case of the term "well depth." A "well depth" refers to the length from the surface to a tool/component in the earth's subsurface. For example, a tool 1000 meters under the Earth's surface has a well depth of 1000 meters and can detect a feature on a borehole wall that has a depth of 1 centimeter relative to the borehole wall surface.

Various embodiments may relate to an apparatus useable for determining a three-dimensional (3D) position of the inside of an enclosed subsurface volume such as a borehole, well pipe, or a spacious tool. A system can analyze a set of known 3D positions of a feature to determine a 3D geometry. Determining the 3D geometry of the inside of a borehole or well pipe can provide an assessment of pipe/equipment integrity, the extent of debris or deposit contamination, the location of a side channel, or the location of different multilateral branch points in the subsurface.

A system can determine a 3D position of a feature using an apparatus that includes a tool body having an attached structured illumination (SI) device in a borehole. The SI device includes one or more light sources and one or more light filter masks ("filter masks"). The filter masks can have a non-uniform profile such as a color profile or an opacity profile, wherein a filter mask having a non-uniform profile has at least one region that has a different color or opacity from another region of the filter mask. Light from the one or more light sources can pass through the one or more filter masks to generate one or more light patterns. A light pattern can be any pattern of light projected onto a surface of an object, wherein the pattern is structured to have at least one well-defined region including a first color and at least one well defined region including a second color, wherein color includes the color "black" and/or the color "white". For example, a light pattern can include a bright region from light passing through a transparent region of a filter mask and at least one well-defined dark region from light being stopped at an opaque region of the filter mask. As an additional example, the light pattern can be a dark grid overlaid on a bright region projected onto an object surface. The apparatus also includes a camera system to acquire one or more images of a feature illuminated by the light pattern(s), wherein the camera system can include a plurality of cameras. The plurality of cameras can include a pair of cameras facing opposite directions, which is an example of circumferentially distributed cameras, and/or a rotating camera to capture 360-degree images around the borehole. In some embodiments, a camera system can include one or more cameras that are at the bottom end of a tool body facing a downhole direction away from the tool body, cameras used in coiled tubing or wireline deployments, etc.

By acquiring and analyzing features illuminated by the light pattern(s), the system can determine a 3D position of the features. Features can include a protrusion, bump, groove, pit, hole, or other structure having a 3D geometry comprising length, width, and depth. The feature can be attached to or a component of any material in the borehole or accessible via the borehole, such as a formation wall, pipe, concrete barrier, metallic structure, tool, debris, etc. The system can use the 3D position of the feature to generate a 3D reconstruction of the adjacent formation, pipe interior, casing interior, a stuck tool, and other regions inside a well. In some embodiments, the system can generate the 3D position by analyzing light pattern distortion to determine a depth between a surface of a feature and the light source using algorithms such as phase curvature detection, fringe analysis, phase unwrapping, and phase to height conversion methods. Light patterns can entail sequential projection, continuous varying patterns, stripe indexing, grid indexing, and combinations of these.

By detecting features using an SI device, the system can provide a caliper-free mechanism to determine the 3D structure of a feature along a 360-degree range, reducing the risks of missing or underestimating deleterious conditions. An understanding of the 3D structure can be used to determine pipe integrity, the extent of debris or deposit contamination within the pipe, the location of a side channel, the appropriate orientation for a fishing tool or a perforation tool, and/or different multilateral branch points in a borehole. With this information, well operations can be improved in a very practical way, by providing information such as how much material is blocking a pipe, the distance separating a fishing tool from its target, the amount and type of material that might resist a perforation event, and the direction of the side channels in a borehole. Example well operations can include drilling operations, fishing operations, well stimulation operations, and/or well injection operations.

Example Wireline System

FIG. 1 is an elevation view of an onshore well system operating a wireline tool that includes a structured illumination (SI) device. The onshore well system 100 includes a pumping system 101 installed next to a borehole 112 in a formation 108. An SI tool 150 can be lowered by a conveyance such as a coiled tubing 114 inside of a barrier 111, which is inside of the borehole 112. In some embodiments, the coiled tubing 114 can be replaced with another conveyance such as a wireline, a slickline, or another cable-based conveyance. The barrier 111 can have a barrier surface 113 and can include one or more components such as metal piping, polymer tubing, a sand screen, etc. The barrier can include a first feature 115 having a physical depth that is further from the SI tool 150 relative to the barrier surface 113. The barrier can include a second feature 125 having a physical depth that is closer to the SI tool 150 relative to the barrier surface 113. In addition, the borehole 112 can have a third feature 135 at the bottom of the borehole.

Figure 9:
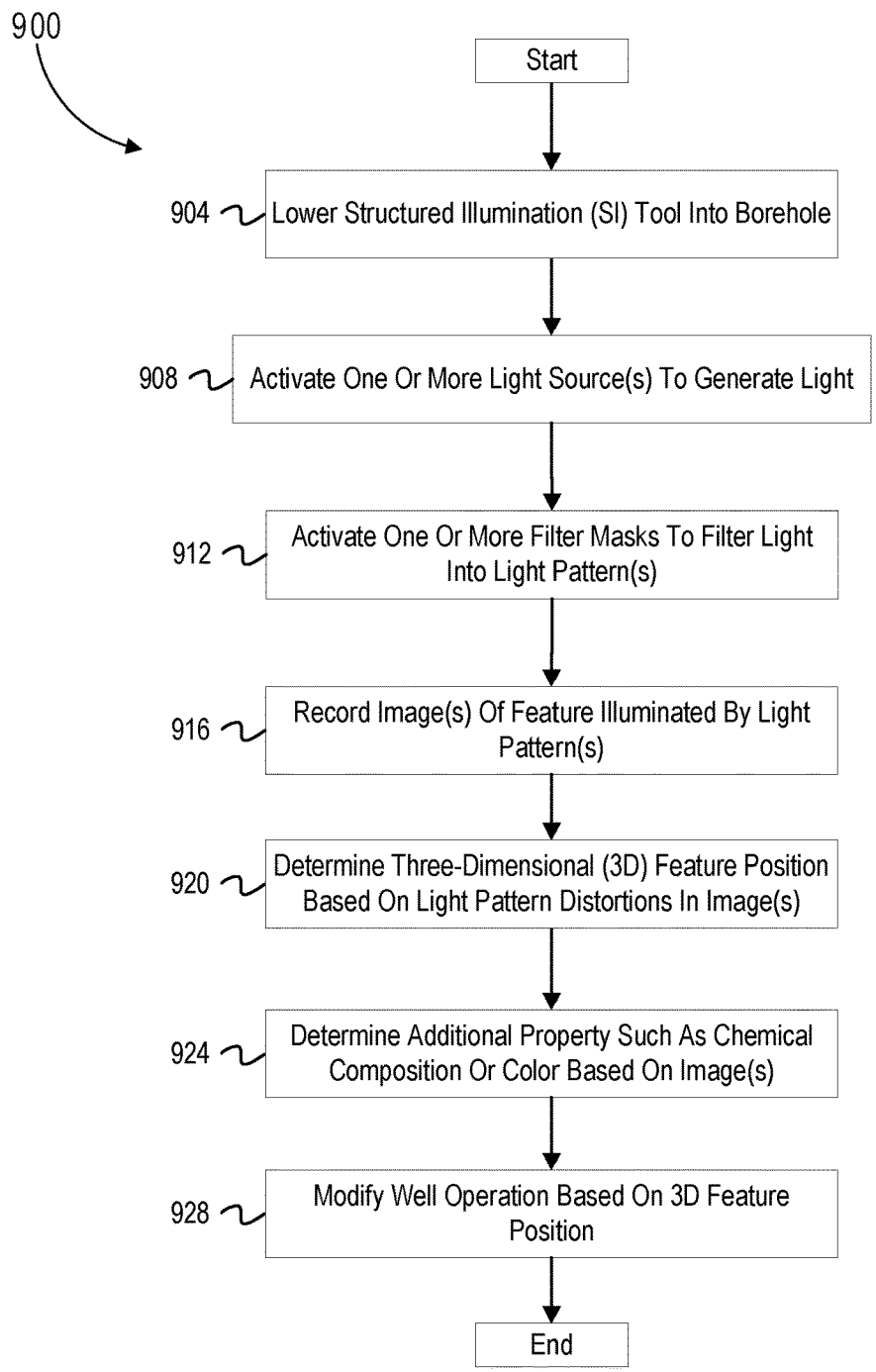
FIG. 9 is a flowchart of operations to operate an SI device in a borehole.

The SI tool 150 can be suspended in the borehole 112 by the coiled tubing 114 that connects the SI tool 150 to a surface system 129 that can include a processor 130 and computer memory devices to perform at least one of the operations described below in the flowchart 900 of FIG. 9. In some embodiments, the SI tool 150 can include a camera system that includes a first camera 118 and a second camera 128, wherein the second camera 128 is approximately 180 degrees offset from the first camera 118 and, in this instance, is facing the opposite radial direction with respect to the first camera 118. The camera system can also include a third camera 138 that faces away from the tool body and towards the bottom of the borehole. The SI tool 150 can also include the SI device 120, which can project a first set of light beams 117 that can form a first light pattern when projected onto a surface, a second set of light beams 127 that can form a second light pattern that is different from the first light pattern when projected onto the surface, and a third set of light beams 137 that can form a third light pattern that is different from the first or second light pattern when projected onto the surface. With reference to FIG. 9 (further described below), the SI tool 150 can also include one or more processors and computer memory devices to perform at least one of the operations described below in the flowchart 900.

In some embodiments, the camera system comprising the first camera 118, the second camera 128, the third camera 138 and/or the SI device 120 can be active during a lowering or a raising operation. Alternatively, the camera system and/or the SI device 120 can turn on in response to the SI tool 150 reaching a target distance or in response to receiving an activation signal. The SI device 120 can project a first light pattern via the first set of light beams 117 onto the barrier surface 113 to illuminate at least a portion of the first feature 115 with a light pattern. The first camera 118 can view the first feature 115 illuminated by the light pattern corresponding with the first set of light beams 117 at a first angle. For example, the first camera 118 can view the first feature 115 at 0 degrees, 30 degrees, 60 degrees, 90 degrees, etc. In some embodiments, the first camera 118 can record feature depth with greater accuracy when it is acquiring images of an illuminated feature at an angle different from the angle of incidence of a light pattern. For example, the SI device 120 can be angled to transmit a light pattern towards the first feature 115 at an angle greater than 5 degrees relative to a line between the first camera 118 and the first feature 115. The second camera 128 can view the second feature 125 illuminated by the light pattern corresponding to the second set of light beams 127 at a second angle, wherein the second angle can be the same as or different from the first angle. While the first camera 118 and second camera 128 are shown to share an axial position with the SI device 120, alternative embodiments can have cameras located at different axial positions. In addition, the third camera 138 can view the third feature 135 illuminated by the light pattern corresponding to the third set of light beams 137.

In some embodiments, the first camera 118, the second camera 128, and/or the third camera 138 can acquire one or more images and transmit the one or more images to the surface system 129 using a telemetry system attached to the coiled tubing 114. In addition, the surface system 129 or a processor in the SI tool 150 can analyze the one or more images to provide a 3D position of one or more elements of the first feature 115, the second feature 125, and/or the third feature 135. For example, the surface system 129 can provide a length, height, and depth of a protrusion for the second feature 125. The results of the analysis can be used to determine the 3D geometry of the feature. Upon determination of a 3D geometry, the surface system 129 can initiate, modify, or stop a well operation. For example, the surface system 129 can initiate a fishing operation to lower a fishing tool to the well depth of the second feature 125, move a fishing tool arm to touch the protrusion of the second feature 125 and fish out a component attached to the second feature 125.

While the SI tool 150 is depicted with three cameras, one camera, two cameras, or any other number of cameras can be used for an SI tool. For example, multiple cameras can be used and arranged to acquire a 360 degree image or video recording of the subsurface system, and selected portions thereof. In some embodiments, the cameras of an SI tool can be side-view or front-view cameras and can span a combined viewing angle of up to 360 degrees. Furthermore, one or more cameras can be rotated to analyze a greater surface area of the subsurface system than can be viewed with a stationary camera. In addition, a camera of the SI tool 150 can be a black and white camera or a camera capable of acquiring image data having colors other than black or white. The camera can be constantly turned on or activated based on a trigger or time interval. For example, the camera can be triggered to only capture an image when a light pattern is generated. In addition, the camera may comprise a charge-coupled device or a complementary metal-oxide semiconductor camera, one or more phase plates, and/or a single pixel camera, and/or can include a light-field camera system.

Example Drilling System

Figure 2:
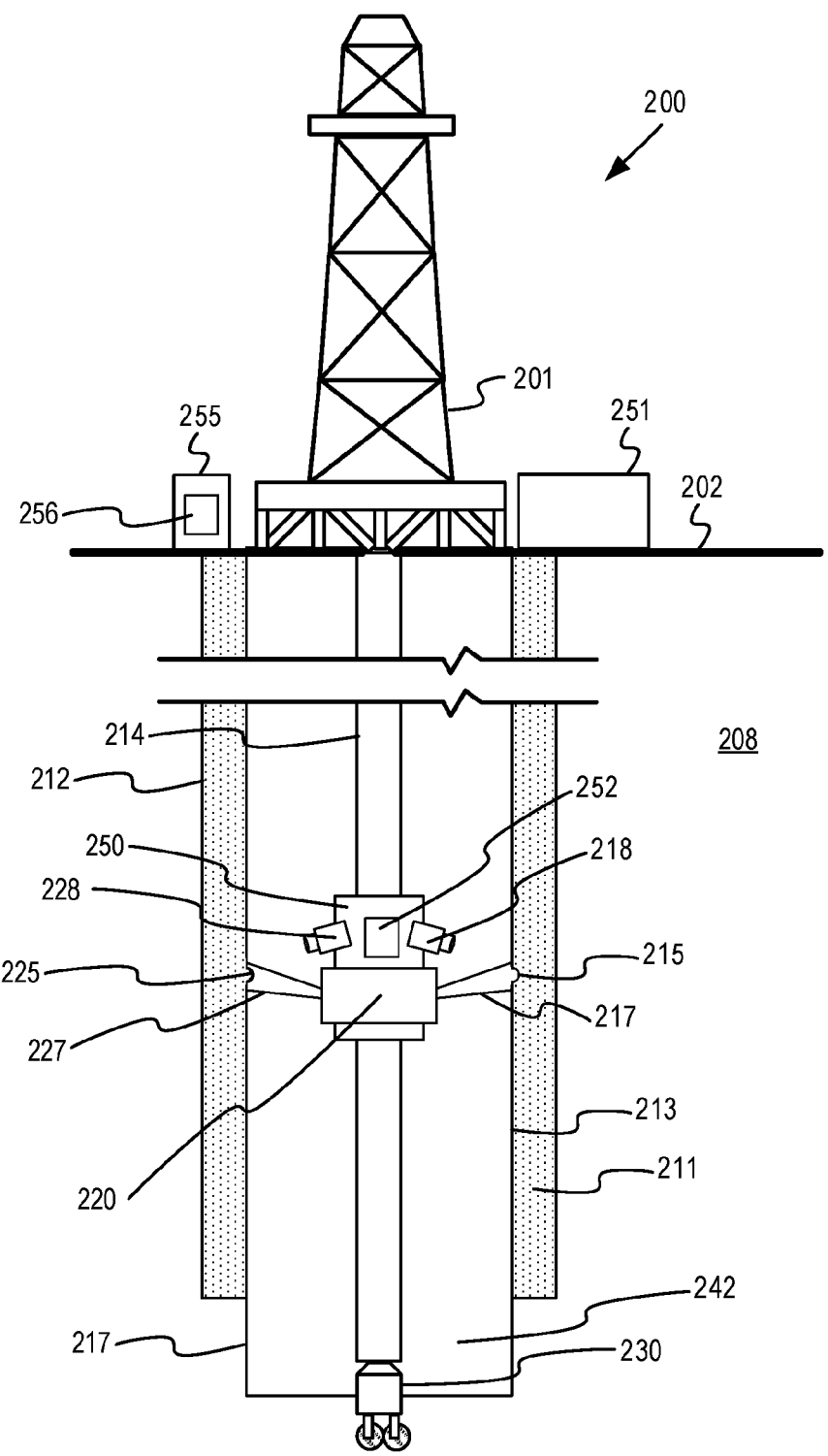
FIG. 2 is an elevation view of an onshore platform operating a downhole drilling assembly that includes an SI device.

FIG. 2 is an elevation view of an onshore platform operating a downhole drilling assembly that includes an SI device. In FIG. 2, a drilling system 200 includes a drilling rig 201 located at the surface 202 of a borehole 212. The drilling system 200 also includes a pump 251 that can be operated to pump fluid through a drill string 214. The drilling system 200 can also include a surface system 255 having a processor 256 that can be used to transmit instructions, receive data from the components in the borehole 212, and/or perform at least one of the operations described below in the flowchart 900 of FIG. 9. The drill string 214 can be operated for drilling the borehole 212 through the subsurface formation 208 using a drill bit 230. The drill bit 230 can be lowered through a cased section that includes the barrier 211 before being used for drilling the newly drilled region 242.

An SI tool 250 attached to the drill string 214 can be lowered along with the drill bit 230. The SI tool 250 is inside of the barrier 211, which is inside of the borehole 212. The SI tool 250 can include a processor 252 and computer memory devices to perform at least one of the operations described below in the flowchart 900 of FIG. 9. In some embodiments, the SI tool 250 can include a camera system that includes a first camera 218 and a second camera 228, wherein the second camera 228 is approximately 180 degrees offset from the first camera 218 and, in the figure, is facing the opposite radial direction with respect to the first camera 218. The SI tool 250 can also include the SI device 220, which can project a first set of light beams 217 that form a first light pattern when projected onto a barrier surface 213 or a borehole surface 217 and second set of light beams 227 that forms a second light pattern when projected onto the barrier surface 213 or borehole surface 217, wherein the light sources of the SI device 220 are at a different axial position than first camera 218 and second camera 228.

In some embodiments, at least one of the first camera 218 and second camera 228 and/or the SI device 220 can be active during a drilling operation to acquire one or more images. Alternatively, at least one of the first camera 218 and second camera 228 can activate in response to the drill bit 230 reaching a target well depth or in response to receiving an activation signal. In some embodiments, the surface system 255 or a processor in the SI tool 250 can analyze the one or more images to provide a 3D position(s) of one or more elements of the first feature 215 and/or the second feature 225. The results of the analysis can be used to determine the 3D geometry of the feature. In some embodiments, image(s) acquired by the first camera 218 and second camera 228 and/or analysis results determined by the SI tool 250 can be transmitted to the surface system 255 using a telemetry system attached to the drill string 214. Example telemetry systems can include fiber optic systems and electrical systems. Alternatively, or in addition, data and/or analysis results can be communicated to the surface system 255 using electromagnetic waves, mud pulse, and acoustic.

Upon determination of a 3D geometry, the surface system 255 can initiate, modify, or stop a drilling operation. For example, the surface system 255 can determine that a barrier is showing structural degradation based on an analysis of the one or more images acquired using the SI tool. In response, the surface system 255 can transmit instructions to stop a drilling operation and/or modify a drilling parameter such as mud flow rate or mud density.

Example Structured Illumination Devices

Figure 3:
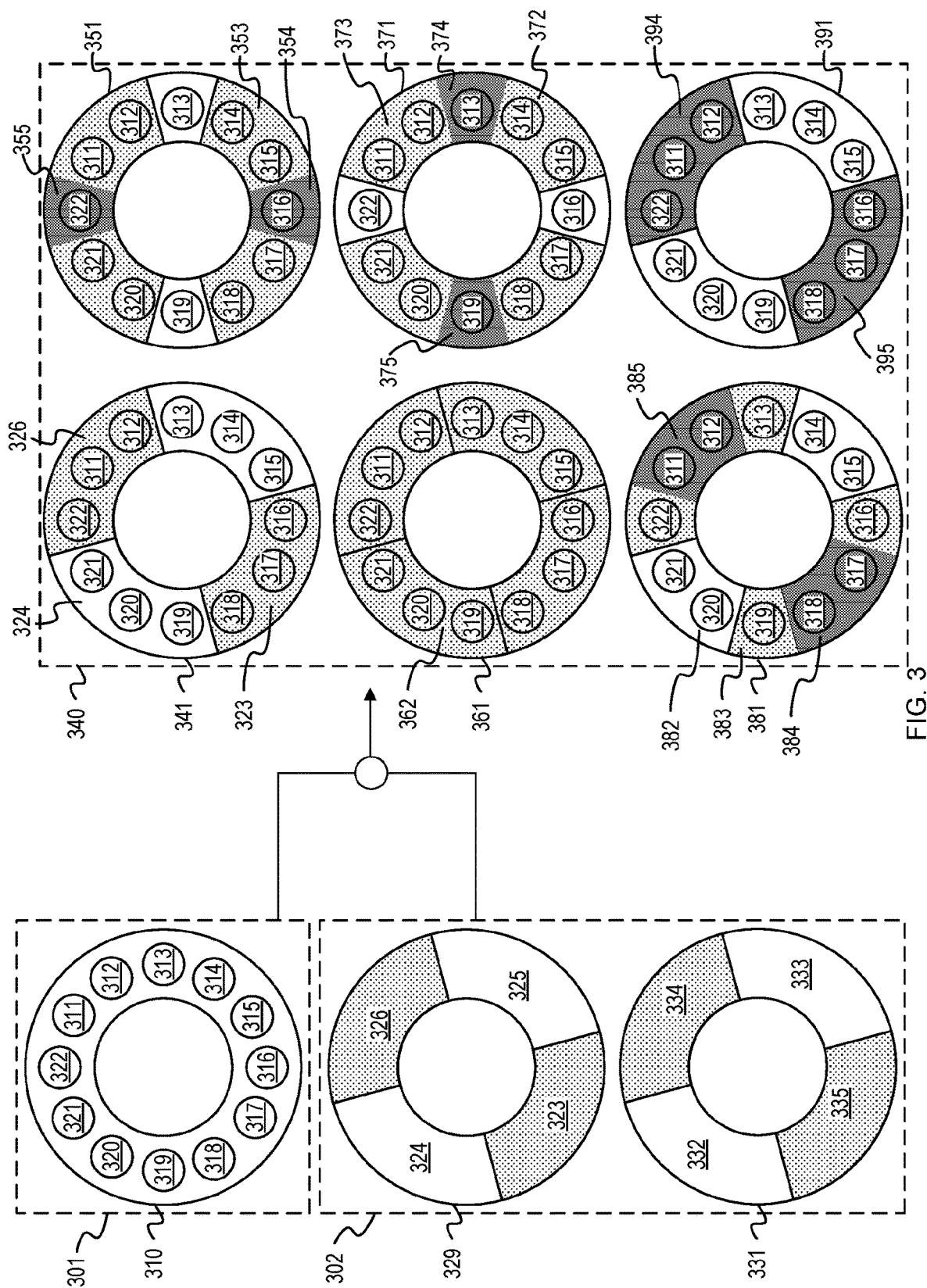
FIG. 3 is a front view of a radially distributed set of light sources, filter masks corresponding to the set of light sources, and combinations of the set of light sources and filter masks usable to form parts of an SI device.

FIG. 3 is a front view of a radially distributed set of light sources, filter masks corresponding to the set of light sources, and combinations of the set of light sources and filter masks usable to form parts of an SI device. The lighting structure 310 in the dashed box 301 include a set of light sources 311-322. One or more light sources of the set of light sources can include a light-emitting diode (LED). Alternatively, or in addition, the one or more light sources can include organic LEDs, polymer LEDs, active-matrix organic LEDs, incandescent light bulbs, tungsten lamps, fluorescent lamps, lasers, superluminescent diodes, spark lamps, metal halide lamps, halogen lamps, sodium lamps, fiber combs, frequency combs, luminescence (electro-, photo-, radio-, thermos-, mechanoluminescence, etc.) and/or a super continuum light source, etc. For example, the first light source 311 can include an LED and the second light source 312 can include a halogen lamp. The one or more light sources 311 can emit light that ranges in color from ultraviolet to infrared. In some embodiments, the light emitted by the one or more light sources can have a light wave bandwidth of only a few nanometers or can have a wide spectrum of thousands of nanometers.

In some embodiments, different light sources can project different colors. Alternatively, or in addition, a light source can include a multi-colored light source. For example, the first light source 311 can include multiple LED sub-components and can emit blue, yellow, and red light. In some embodiments, one or more light sources in the set of light sources can be activated independently of one another or be activated in groups and/or emit light waves at different intensities from each other. For example, the first light source 311 can be activated to emit blue light independently of the second light source 312, and the second light source 312 can be turned off or activated to emit red light at the same time that the first light source 311 is emitting blue light.

The dashed box 302 includes a first filter mask 329 and a second filter mask 331. The first filter mask 329 and the second filter mask 331 can be similarly constructed and can reduce the intensity of light traveling through the filter. For example, the shaded regions 323 and 326 and 334-335 can each include a filter that reduces the luminosity of a light source by 50%. In addition, the first filter mask 329 can include open regions 324 and 325 and the second filter mask 331 can include the open regions 332 and 333. The open regions can be empty or can include a transparent material that does not substantially reduce the intensity of light traveling through the filter.

In some embodiments, the filters masks can include a series of spaced components such as metal strips that are at different heights with respect to the edge of the filter mask, wherein each component in a series of spaced components have a physical space separating them. The metal strips can be overlaid or placed edge to edge to create a specific structured illumination pattern when located between a light source and an illuminated surface. For example, each of the shaded regions 323 and 326 and 334-335 can include a series of metal strips. The strips can be rotated independently to form one or more alternative patterns, which can increase the accuracy of feature depth predictions during image analysis of surfaces illuminated by the one or more alternative patterns. In some embodiments, the filter masks include of a series of rings that are co-axial with a tool body and continuously change an optical transmission (i.e. have a varying optical transmission coefficient), wherein a ring is a hollow cylindrical object of any length or width. Alternatively, or in addition, the filter masks can continuously change an optical phase delay. In some embodiments, the metal strips can include different spacing distances to allow for different resolutions. For example, the metal strips can have a first spacing that is double the length of a second spacing, wherein the second spacing is double the length of a third spacing, and thus the first spacing is quadruple the length of the third spacing. These variations in spacing, optical transmission, and optical phases can be used to generate different light patterns.

In some embodiments, one or more of the set of filter masks can include electrochromatic filters having a grid pattern of filters covering one or more camera lenses. A pattern of voltages can be applied with a specific voltage for each grid section to darken the grid section by a selected amount, blocking the optical light and creating/altering an illumination pattern. In some embodiments, the grid size can be small enough to obtain a fringe edge resolution selected for a target depth resolution. In some embodiments, one or more of the set of filters can include a resistive wire to create a continuously varying voltage onto a certain grid segment to alter an illumination pattern.

The dashed box 340 includes a set of possible combinations of the lighting structure 310 and at least one of the first filter mask 329 and the second filter mask 331. Each of the possible combinations can be physically constructed such that the first filter mask 329 and second filter mask 331 are immobile and fixed to the lighting structure 310. Alternatively, or in addition, the first filter mask 329 and second filter mask 331 can be constructed to rotate with respect to the center of the lighting structure 310 and produce different light patterns when the set of light sources 311-322 are activated. With respect to FIG. 1 and FIG. 2, each of combinations depicted in the dashed box 340 can be used in the SI tool 150 or the SI tool 250 to generate different light patterns. The features illuminated by the different light patterns from the combinations below or other light patterns can be analyzed to determine a 3D position of a feature.

A first combination 341 includes the first filter mask 329 overlaid and concentric with the lighting structure 310. The first combination 341 includes the shaded regions 323 and 326 overlaid on top of the light sources 322 and 311-312 and 316-318 from the lighting structure 310. Similarly, the open regions 324-325 permit light from the light sources 313-315 and 319-321 to pass through with zero reduction in luminosity or a minor reduction in luminosity, wherein the minor reduction can mean a less than 3% reduction in luminosity. Once the light sources 311-322 are activated, the first combination 341 can generate a circular pattern on a flat surface, wherein the circular pattern includes two semi-circle light regions concentric with two darker, but still illuminated regions.

The dashed box 340 includes a second combination 351 that can be formed by the addition of the second filter mask 331 to the first combination 341. The second filter mask 331 can be concentric with the first filter mask 329 and rotated 60 degrees counter-clockwise with respect to the center of the first filter mask 329. The second combination 351 includes single-layer shaded regions such as the single-layer shaded region 353 formed from one of the shaded regions 323 and 326 and 334-335. The second combination 351 also includes overlapping shaded regions 354-355 formed from the overlap of the shaded regions 323 and 326 and 334-335. Each of the overlapping shaded regions 354-355 overlap with the light source 316 and 322, respectively. The overlapping shaded region 354 covers the light source 316, and the overlapping shaded region 355 covers the light source 322. Each of the overlapping shaded regions 354 and 355 reduce luminosity by an increased amount compared to the single-layer shaded region 353. For example, the combined overlapping shaded region 354 can reduce the luminosity of light entering the overlapping shaded region 354 by 75%. In some embodiments, the shaded regions can reduce luminosity by other amounts. For example, a single-shaded region and overlapping shaded region can reduce luminosity by 60% and 100%, respectively.

The dashed box 340 includes a third combination 361 that can be formed by combining the first filter mask 329 with the second filter mask 331, rotating one or both of the filter masks to form a shaded annulus 362, and laying the combined filter masks over the lighting structure 310. In some embodiments, one or both of the first filter mask 329 and the second filter mask 331 can mechanically rotate around the center of the lighting structure 310 to form the shaded annulus 362. Once the shaded annulus 362 is positioned over the lighting structure 310, each of the light sources 311-322 can have their luminosity reduced by one of the shaded regions in the first filter mask 329 or the second filter mask 331.

The dashed box 340 includes a fourth combination 371 that can be formed by combining the first filter mask 329 with the second filter mask 331, rotating one or both of the filter masks to form a pattern including both single-shaded regions and overlapping shaded regions, and laying the combined filter masks over the lighting structure 310. In some embodiments, one or both of the first filter mask 329 and the second filter mask 331 can mechanically rotate around the center of the lighting structure 310 to form the fourth combination 371. For example, the first filter mask 329 and second filter mask 331 can be arranged in a way similar to the second combination 351 and can be simultaneously rotated 90 degrees to form the fourth combination 371. The fourth combination 371 includes single shaded regions such as the single-shaded region 373 formed from one of the shaded regions 323 and 326 and 334-335. The fourth combination 371 also includes overlapping shaded regions 374 and 375 formed from the overlap of the shaded regions 323 and 326 and 334-335. The overlapping shaded region 374 covers the light source 313, and the overlapping shaded region 375 covers the light source 319. Each of the overlapping shaded regions 374 and 375 reduce luminosity by an increased amount. For example, the combined overlapping shaded region 374 can reduce the luminosity of light entering the overlapping shaded region 374 by 75%.

The dashed box 340 includes a fifth combination 381 that can be formed by combining the first filter mask 329 with the second filter mask 331, rotating one or both of the filter masks to form a pattern including both single-shaded regions and overlapping shaded regions, and laying the combined filter masks over the lighting structure 310. In some embodiments, one or both of the first filter mask 329 and the second filter mask 331 can mechanically rotate around the center of the lighting structure 310 to form the fifth combination 381. For example, the first filter mask 329 and second filter mask 331 can be arranged in a way similar to the third combination 361, and the second filter mask 331 can be rotated clockwise by 60 degrees to form the fifth combination 381. The fifth combination 381 can include single-layer shaded regions such as the single-layer shaded region 383. The fifth combination 381 also includes overlapping shaded regions 384-385 formed from the overlap of the shaded regions 323 and 326 and 334-335. The overlapping shaded region 384 covers the light sources 317-318, and the overlapping shaded region 385 covers the light sources 311-312. Each of the overlapping shaded regions 384 and 385 reduce luminosity by an increased amount. For example, the combined overlapping shaded region 384 can reduce the luminosity of light entering the overlapping shaded region 384 by 75%.

The dashed box 340 includes a sixth combination 391 that can be formed by combining the first filter mask 329 with the second filter mask 331, rotating one or both of the filter masks to form a pattern including two overlapping shaded regions, and laying the combined filter masks over the lighting structure 310. In some embodiments, one or both of the first filter mask 329 and the second filter mask 331 can mechanically rotate around the center of the lighting structure 310 to form the sixth combination 391. For example, the first filter mask 329 and second filter mask 331 can be arranged in a way similar to the fifth combination 381, and the second filter mask 331 can be rotated clockwise by 30 degrees to form the sixth combination 391, wherein the shaded regions of the second filter mask 331 are laid directly on top of one of the shaded regions of the first filter mask 329. The sixth combination 391 includes overlapping shaded regions 394 and 395 formed from the overlap of the shaded regions 323 and 326 and 334-335. The overlapping shaded region 394 covers the light sources 316-318, and the overlapping shaded region 395 covers the light sources 322 and 311-312. Each of the overlapping shaded regions 394 and 395 reduce luminosity by an increased amount. For example, the combined overlapping shaded region 394 can reduce the luminosity of light entering the overlapping shaded regions 394 and 395 by 75%.

In some embodiments, one or more of the set of filter masks can filter out different ranges of wavelength. For example, at least one of the shaded regions in the first filter mask 329 can filter blue wavelengths and at least one of the shaded regions in the second filter mask 331 can filter red wavelengths. In some embodiments, one or more of the set of filter masks can filter out specific polarizations or apply an optical phase delay. In some embodiments, one or more of the set of filter masks can include optically clear lenses that can be used to collimate or focus the light that enters them. For example, one or both of the shaded regions 334 and 335 in the second filter mask 331 can collimate light and apply a specific polarization on the collimated light. In some embodiments, one or more shaded region of a filter mask can filter only a portion of a light source. For example, a filter mask can include an arrangement of shaded regions that obscure half the surface area of the light sources 322, 313, 316, and 319.

Figure 4:
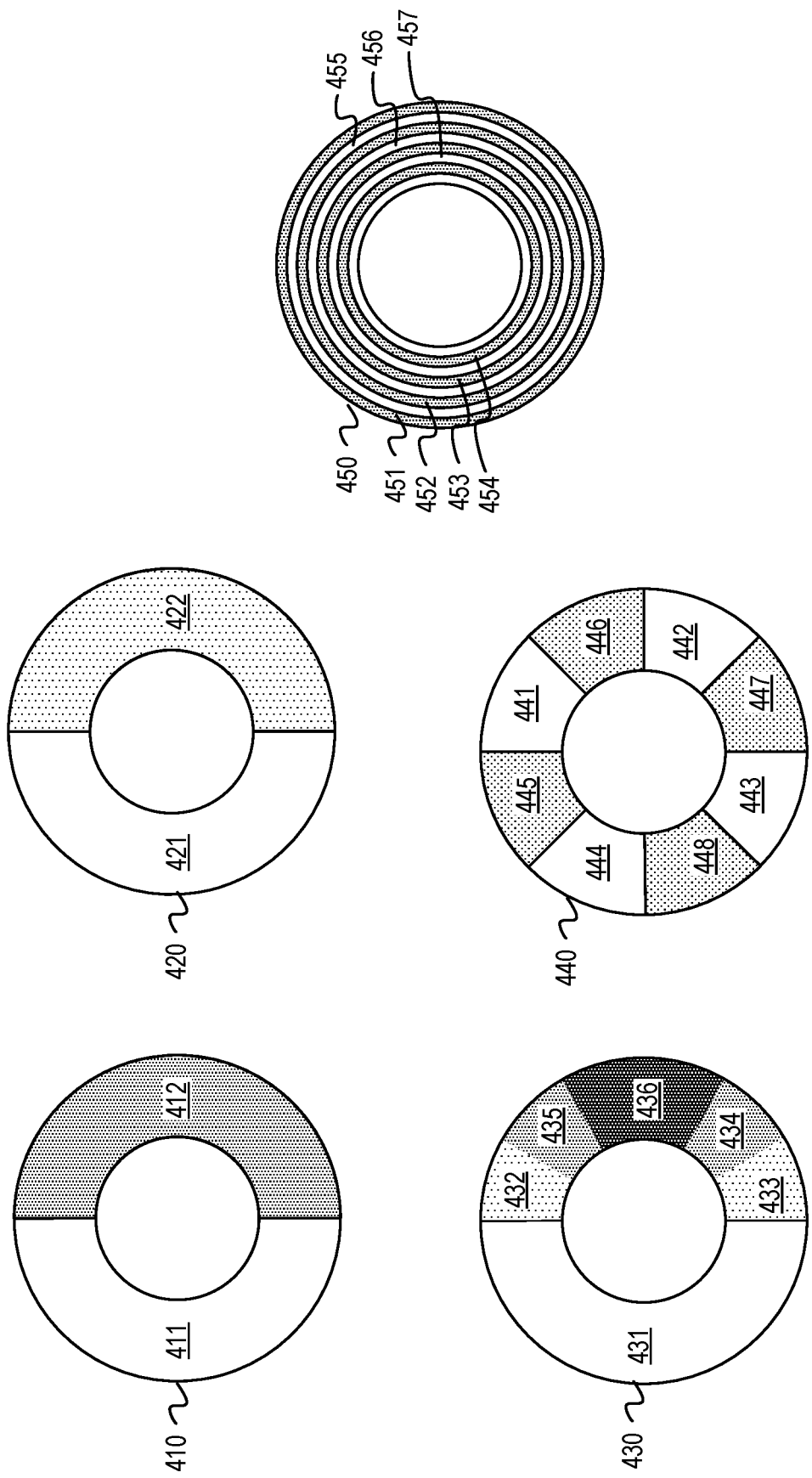
FIG. 4 is a front view of a set of filter masks.

FIG. 4 is a front view of a set of filter masks. A first filter mask 410, second filter mask 420, third filter mask 430, fourth filter mask 440, and/or fifth filter mask 450 are each circular filter masks having at least one filtering region and/or at least one transparent region. With reference to FIG. 3, one or more of the filter masks 410, 420, 430, 440, and 450 can be used in addition to or in place of any of the filter masks 329 and 331. The first filter mask 410 includes a transparent region 411 and a filtering region 412 that can reduce light having an intensity of 100 lumens by 50%. The second filter mask 420 includes a transparent region 421 and a filtering region 422 that can reduce light having an intensity of 100 lumens by 25%. The third filter mask 430 includes a transparent region 431, a first filtering region 432 and second filtering region 433 that can reduce light having an intensity of 100 lumens by 25%, a third filtering region 434 and fourth filtering region 435 that can reduce light having an intensity of 100 lumens by 50%, and a fifth filtering region 436 designed to reduce light having an intensity of 100 lumens by 75%. The fourth filter mask 440 includes a set of transparent regions 441-444 and a set of filtering regions 445-448, wherein each of the filtering regions 445-448 can reduce light having an intensity of 100 lumens by 50%. The fifth filter mask 450 includes a set of annular shaded regions 451-454 in an alternating pattern with a set of annular transparent regions 455-457, wherein each of the set of annular transparent regions 455-457 are between one of the annular shaded regions 451-454.

The first filter mask 410, second filter mask 420, third filter mask 430, fourth filter mask 440, and/or fifth filter mask 450 can be positioned in front of a circular set of light sources to generate a light pattern. In some embodiments, two or more of the filter masks can be concentric and form different light patterns. Alternatively, or in addition, the filter masks can be rotated to either in isolation or when positioned together to generate different light patterns. In other embodiments, filter masks can have boundaries between regions that are angled relative to the radial direction. Furthermore, one or more of the shaded regions in a filter mask can filter light traveling through the shaded region to generate a specific color or light sub-pattern.

In some embodiments, a set of filter masks can be used simultaneously to generate the light pattern to more accurately capture a 3D position, wherein a first filter mask of the set of filter masks has a pattern feature boundary directed in a radial direction and a second filter mask of the set of filter masks has a pattern feature boundary directed in a circumferential direction. For example, the fourth filter mask 440 and the fifth filter mask 450 can be used simultaneously or sequentially to generate a light pattern having both a radial pattern corresponding with the fourth filter mask 440 and a circumferential pattern corresponding with the fifth filter mask 450. Furthermore, in some embodiments, the filtering regions can reduce light brightness by various amounts other than 50% or 75%, such as 1% reduction and 100% reduction. For example, a filtering region can have 100% opacity and thus 100% light reduction. In some embodiments, a filter mask can have various angles rotations such as 0 degrees, 30 degrees, 60 degrees, 90 degrees, 150 degrees, and 180 degrees. Furthermore, while the filtering regions of the filter masks 410, 420, 430, 440, and 450 are shown to be in discrete regions, other filter masks can have gradual changes in opacity.

Figure 5:
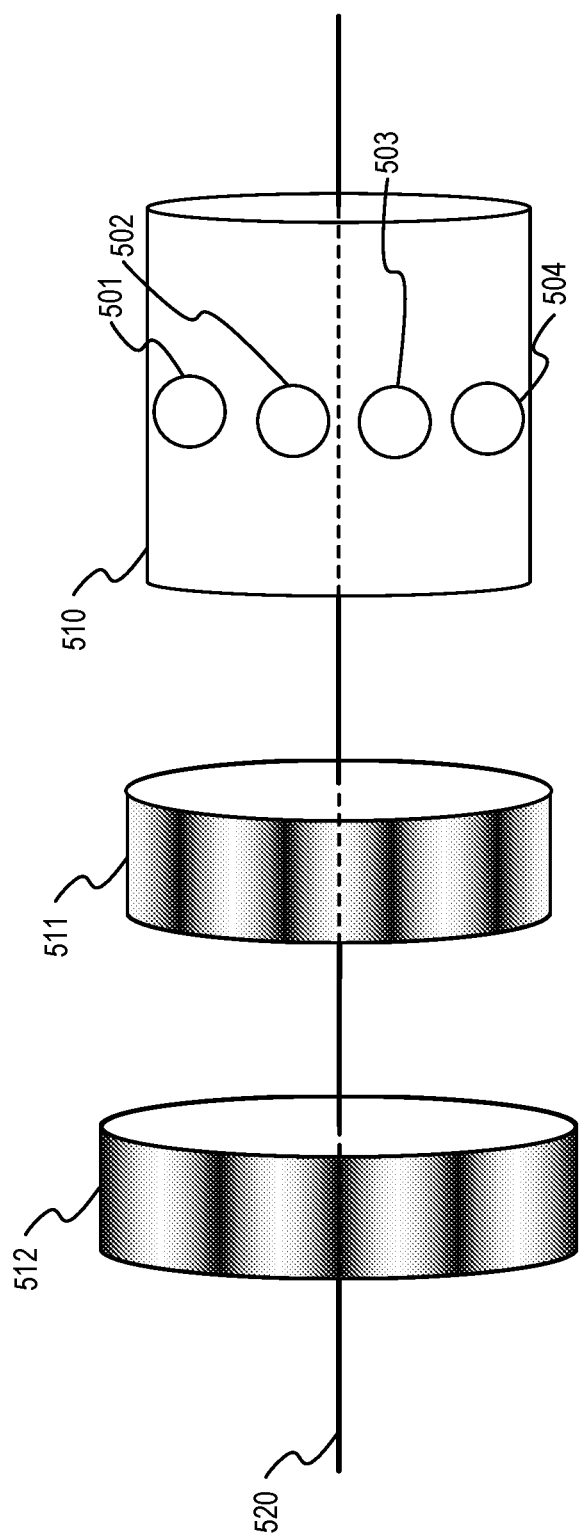
FIG. 5 is a side view of a circumferentially distributed set of lights and two filter masks corresponding to the set of lights.

FIG. 5 is a side view of a circumferentially distributed set of lights and two filter masks corresponding to the set of lights. When used herein, a "circumferentially distributed set of lights" means a set of lights that are periodically distributed on a circumference of a cylindrical shape angles relative to an axis of the cylindrical shape. An SI device can include a housing 510. The housing 510 can include a first light source 501, second light source 502, third light source 503, and fourth light source 504. A first ring filter mask 511 and a second ring filter mask 512 are both ring filter masks, wherein the first ring filter mask 511 has a smaller diameter than the second ring filter mask 512. Each of the first ring filter mask 511 and second ring filter mask 512 can be substantially co-axial with respect to the housing axis 520. In some embodiments, the first ring filter mask 511 and the second ring filter mask 512 can slide over the set of light sources 501-504. In addition, the first ring filter mask 511 and the second ring filter mask 512 can be rotated with respect to each other to form different gradient patterns. In some embodiments, after a first image with a corresponding first pattern is acquired, at least one of the ring filter masks 511-512 can slide to a second axial position and a second image with a corresponding second pattern can be acquired. Alternatively, or in addition, one or both of the first ring filter mask 511 and second ring filter mask 512 can rotate around the housing axis 520 and generate different light patterns on a surrounding surface. In some embodiments, the first ring filter mask 511 and second ring filter mask 522 can have different periodic patterns with respect to a brightness and/or color gradient. For example, a first ring filter mask can have a sin(x) pattern and a second ring filter can have a sin(2x) pattern. Images of features illuminated by different light patterns can increase the accuracy when determining a feature geometry.

Figure 6:
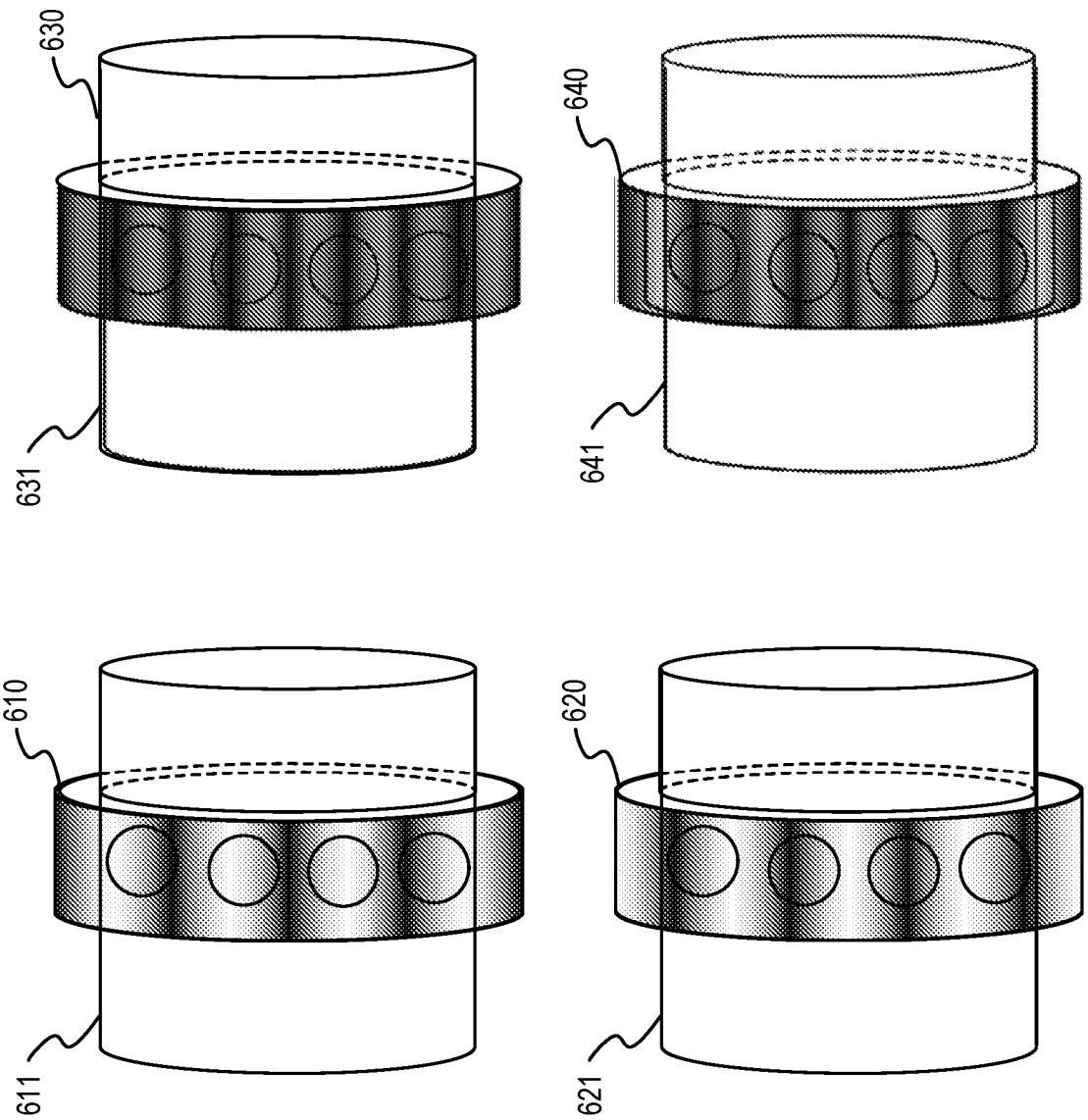
FIG. 6 is a side view of a set of configurations of an SI device using two filter masks.

FIG. 6 includes a set of SI devices having varying ring filter mask arrangements: a first SI device 611 having a first ring filter mask arrangement 610, a second SI device 621 having a second ring filter mask arrangement 620, a third ring filter mask arrangement 630 having a combined mask set 631, and a fourth ring filter mask arrangement 640 having a combined mask set 641; wherein each arrangement includes the housing 510, the first ring filter mask 511, and the second ring filter mask 512 shown in FIG. 5. Due to the implicit existence of elements labeled in FIG. 5, that make up elements labeled in FIG. 6, the following discussion will refer to components that can be found in either FIG. 5 or FIG. 6, or both. With reference to FIG. 1 and FIG. 2, one or more of the SI devices 611, 621, 631, or 641 can be similar or identical to the SI device 120 or the SI device 220.

The first ring filter mask arrangement 610 shows the shaded regions of the first ring filter mask 511 and the shaded regions of the second ring filter mask 512 in radial alignment with each other. With respect to FIG. 5, radial alignment can mean that a line radially extending from the housing axis 520 can intersect with both the shaded regions of the first ring filter mask 511 and the shaded regions of the second ring filter mask 512 when the pair of ring filter masks are at a same axial position. The first ring filter mask arrangement 610 in FIG. 6 can generate a first light pattern, wherein the illuminated area of a surface illuminated by the light pattern can have a sinusoidal light intensity.

The second ring filter mask arrangement 620 in FIG. 6 shows the shaded regions of the first ring filter mask 511 and the shaded regions of the second ring filter mask 512 in radial alignment with each other, wherein the radial alignment of the first ring filter mask 511 and second ring filter mask 512 in the second ring filter mask arrangement is shifted by a first angular offset with respect to the radial alignment of the ring filter masks 511 and 512 of the first ring filter mask arrangement 610. In some embodiments, the first ring filter mask 511 and second ring filter mask 512 of the second ring filter mask arrangement 620 can be fixed to the housing 510, so as to be non-rotating. Alternatively, in some embodiments, the pair of ring filter masks 511-512 can be rotatable around the housing 510, and the second ring filter mask arrangement 620 can be produced by mechanical rotation of the ring filter masks 511 and 512 in the first ring filter mask arrangement 610. In some embodiments, at least one of the pair of ring filter masks 511-512 can be an electrochromatic filter and can generate and/or rotate a light pattern by changing a voltage pattern as further described below. The second ring filter mask arrangement 620 can generate a second light pattern similar to the first light pattern after applying the first angular offset, wherein the illuminated area of a surface illuminated by the second light pattern can have a sinusoidal light intensity. While FIG. 5 shows the ring filter masks having a sinusoidal opacity profile, a filter mask can have various other opacity profiles to generate light patterns. For example, a filter mask can have a periodic Gaussian opacity profile to generate a periodic Gaussian light pattern, a Poissonian opacity profile to generate a Poissonian light pattern, a periodic sawtooth opacity profile to generate a periodic sawtooth opacity, etc.

The third ring filter mask arrangement 630 shows the shaded regions of the first ring filter mask 511 and the shaded regions of the second ring filter mask 512 having a second angular offset with respect to each other. In some embodiments, one or both of the pair of ring filter masks 511-512 can be rotatable around the housing 510 and the third ring filter mask arrangement 630 can be produced from the first ring filter mask arrangement 610 by mechanical rotation of the first ring filter mask 511 around the housing 510 by the second angular offset. The third ring filter mask arrangement 630 can generate a third light pattern, wherein the illuminated area of a surface illuminated by the third light pattern can have a circumferential light pattern comprising of light and dark regions.

The fourth ring filter mask arrangement 640 shows the shaded regions of the first ring filter mask 511 and the shaded regions of the second ring filter mask 512 having a third angular offset with respect to each other. In some embodiments, the pair of ring filter masks 511-512 in the third ring filter mask arrangement 630 can mechanically rotate by the third angular offset to form the fourth ring filter mask arrangement 640. As another alternative, the first ring filter mask 511 in the second ring filter mask arrangement 620 can mechanically rotate by the third angular offset to function in the same way as the fourth ring filter mask arrangement 640. The fourth ring filter mask arrangement 640 can generate a fourth light pattern, wherein the illuminated area of a surface illuminated by the fourth light pattern can have a circumferential light pattern comprising of light and dark regions similar to the third light pattern after applying the third angular offset.

Figure 7:
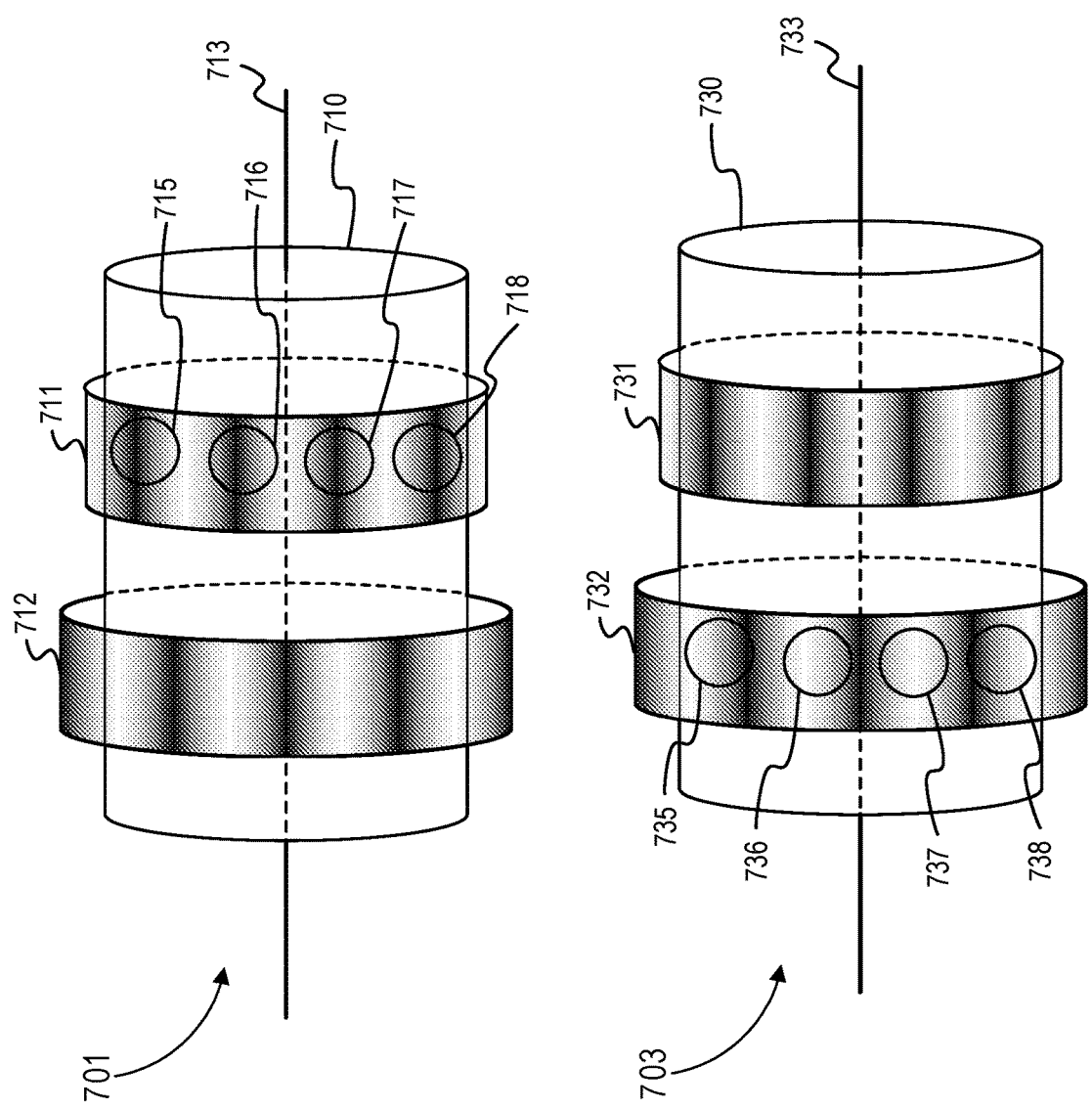
FIG. 7 is a side view of two SI devices.

FIG. 7 is a side view of two SI devices. With reference to FIG. 1 and FIG. 2, one or both of a first SI device 701 and a second SI device 703 can be similar or identical to the SI device 120 or the SI device 220. The first SI device 701 includes a housing 710 having a housing axis 713. The first SI device 701 also includes an inner ring filter mask 711 and an outer ring filter mask 712, wherein both filter masks cover at least a portion of the housing 710 and are coaxial with the housing 710. The second SI device 702 includes a housing 730, an inner ring filter mask 731 around and coaxial with the housing 730, and an outer ring filter mask 732 around and coaxial with the housing 730. With respect to FIG. 5, inner ring filter masks 711 and 731 can be similar to or the same as the first ring filter mask 511, and the outer ring filter masks 712 and 732 can be similar to or the same as the second ring filter mask 512.

The set of light sources 715-718 can be at the same axial position as the inner ring filter mask 711 along the housing axis 713. In some embodiments, the inner ring filter mask 711 can be fixed to the housing 710 and the outer ring filter mask 712 can axially slide from a first axial position to a second axial position, wherein the second axial position is the axial position of the inner ring filter mask 711. Similarly, in some embodiments, the set of light sources 735-738 can be at the same axial position as the inner ring filter mask 731 along the housing axis 733. In some embodiments, the outer ring filter mask 732 can be fixed to the housing 730 and the inner ring filter mask 731 can axially slide from a third axial position to a fourth axial position, wherein the fourth axial position is the axial position of the outer ring filter mask 732.

Figure 8:
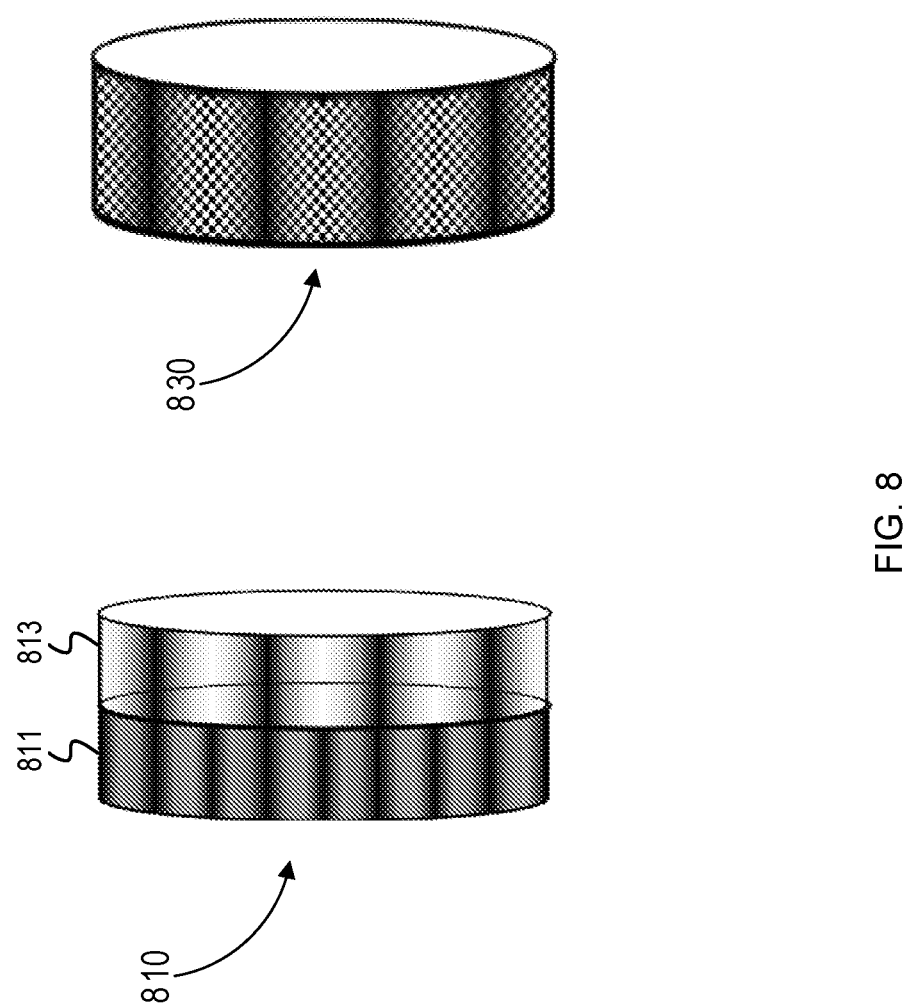
FIG. 8 is a side view of a set of ring filter masks showing combinations of different profiles.

FIG. 8 is a side view of a set of ring filter masks showing combinations of different profiles. FIG. 8 includes a first ring filter mask 810 and a second ring filter mask 830. In some embodiments, filter masks can have different profiles for different sections of the filter mask. For example, a left segment 811 of the first ring filter mask 810 can have a sin(2x) opacity profile with a first opacity range from 0.5 to 1.0 and a right segment 813 of the first ring filter mask 810 can have a sin(x) opacity profile with a second opacity range from 0.0 to 1.0. As a second example, a second ring filter mask 830 can have a sin(x) opacity profile convoluted with a checkboard profile. A filter mask having a plurality of profiles having symmetry along multiple directions and/or coordinate systems in a SI device can increase the accuracy/precision of a 3D feature position determined using the SI device. The plurality of profiles can also allow the accuracy/precision of a 3D feature position determined in a first coordinate direction to be independent of the accuracy/precision of that 3D feature position determined in an orthogonal coordinate direction. Further, the two values can be combined (using an average, weighted average, method of least squares, convolution) or compared (using continuity of directional gradients) to ensure lower error in position determination. While periodic profiles and checkerboard profiles are described in FIG. 8, an SI device can include use various other profiles for a filter mask. For example, an SI device can include a multi-colored profile having at least three colors in a hexagonal grid on an annular filter mask, a rainbow color profile that changes color across at a circumference of a ring filter mask and has a sin(3x) opacity profile along length of the ring filter mask, a black and white set of tessellating triangles as a profile on a filter mask, etc.

Example Flowchart

The flowchart described below is provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 908-920 of FIG. 9 can be performed in parallel or serially. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

FIG. 9 is a flowchart of operations to operate an SI device in a borehole. FIG. 9 depicts a flowchart 900 of operations to determine a 3D feature position using a system that includes a processor. For example, operations of the flowchart 900 can be performed using a system similar to the surface system 129 or computer device 1000 shown in FIGS. 1 and 10, respectively. The flowchart 900 includes operations that can be executed by the processor to determine a 3D position of a feature in a borehole. Operations of the flowchart 900 start at block 904.

At block 904, the system can operate to lower an SI tool into a borehole. The SI tool can include at least one camera and an SI device, wherein the SI device includes at least one light source and at least one filter mask. For example, the SI tool can be lowered into a partially cased borehole. In some embodiments, the SI tool can include a plurality of cameras circumferentially distributed to acquire one or more images around the circumference of the SI tool. For example, the SI tool can include three cameras that are arranged approximately 120 degrees apart around the axis of the SI tool. Alternatively, or in addition, the SI tool can include one or more cameras oriented in a downhole direction to image in front of the tool. For example, the SI tool can include a set of cameras oriented in a downhole direction and a set of circumferentially distributed cameras.

At block 908, the system can activate the one or more light sources to generate light. The one or more light sources can include LEDs, cathode ray tubes, filament light bulbs, etc. The one or more light sources can generate multi-spectrum light and/or light emitted at a single wavelength. The one or more light sources can be activated to emit light without pause or to emit light at a repeating interval. In some embodiments, the SI tool can include a plurality of light sources, which can be activated independently or in groups.

At block 912, the system can activate the one or more filter masks to filter the light into one or more selected light patterns. In some embodiments, the filter masks are pre-installed over the light sources and do not require additional movement to filter the light from the light sources to generate light patterns. Alternatively, the system can operate to move one or more filter masks to filter the light from the light sources into light patterns or to change the light pattern being generated from a first light pattern to a second light pattern. For example, with respect to FIG. 7, the system can move the outer ring filter mask 712 to be at the same axial position as the set of light sources 715-719 to generate a second light pattern once the light sources 715-719 are activated. In some embodiments, the second light pattern can have a different pattern, color, or be otherwise visually different from the first light pattern. For example, the second light pattern can have one or more colors that are different from the first light pattern. Alternatively, or in addition, the filter masks can be electrochromatic and activating the one or more filter masks can include applying and/or changing a current or voltage through the one or filter masks.

At block 916, the system can record one or more images of a feature being illuminated by the one or more light patterns. In some embodiments, the SI tool can include one or more cameras that are turned on and acquiring an image before the light sources of the SI tool are activated. Alternatively, the one or more cameras can be turned on during or after the light sources of the SI tool are activated. In some embodiments, one or more of the cameras can be positioned on a rotating platform or otherwise include a rotating mechanism that allows the one or more cameras to rotate around an axis of the SI tool. Alternatively, the system can include a plurality of cameras that are positioned to acquire different images at the same well depth, wherein a center point of each set of visual images is different for each camera. Alternatively, or in addition, images from different cameras can represent the same portion of the borehole surface. For example, a pair of images being captured by two different cameras on an SI tool can have an overlapping region with respect to each other.

At block 920, the system determines a 3D feature position based on distortions in the light patterns recorded in the one or more images. The system can determine a 3D feature position by applying analysis methods to determine a feature depth. In some embodiments, the analysis methods can include using phase unwrapping and fringe analysis methods to determine the presence and 3D geometry of a feature. In addition, the method can include the use of phase curvature detection to determine the presence and 3D geometry of a feature. The system can apply Fourier filtering or digital holography techniques useful for imaging through scattering media such as water with particulates. In some embodiments, the system can combine multiple images of a surface being illuminated by one light pattern in order to improve the signal to noise ratio and/or image resolution. Furthermore, the combination of multiple images can be used to confirm that the required SI pattern has been set. For example, the system can use a first image acquired while a first light pattern is illuminating a feature and a second image acquired while a second light pattern is illuminating the feature and determine a 3D position of the feature based on a convolution, average, dot product, addition, or other combination of the two images. In addition, the system can apply a phase-to-height conversion of the analyzed data to generate a visualization of the feature.

In some embodiments, a series of light patterns can be generated using filter masks having multiple, vertical, phase-shifted sinusoidal fringe waves $I_{i,j}$ for an opacity profile i,j given by Equation 1 below, wherein x and y are the spatial indices for a position in the image, I is an intensity constant, $\delta_i$ is a phase shift, $N_j$ is a fringe number that can vary between a set of values chosen to obtain the needed spatial resolution of features, and p is a pitch of the profile:

$$I_{i,j} = I * \left[1 + \cos\left(N_j \frac{2\pi}{p} \frac{x}{y} + \delta_i\right)\right] \quad (1)$$

In some embodiments, $N_j$ can have values such as 1, 3, 9, and 27 to obtain variations in feature size greater than 10. In addition, the set of $\delta_i$ is chosen to ensure phase overlap of the fringes. For example, of $\delta_i$ can equal $$\left\{\frac{\pi}{4}, \frac{\pi}{2}, \ldots \frac{7\pi}{4}, 2\pi,\right\}.$$

Furthermore, the values of the variables in Equation 1 can be set to minimize computational resources use and increase the accuracy/precision of calculations that use filter masks having opacity profiles based on Equation 1. Once the patterns are projected onto a surface, the resulting image can be interpreted as a baseline illumination (background or DC component) with different phase-shifted modulation patterns that depend on phase on top of this baseline.

After acquiring images of surfaces illuminated by the light patterns generated using one or more filter masks flail having a sinusoidal fringe wave opacity profile, the underlying baseline illumination can be calculated by eliminating the brightness in the image due to the baseline illumination and extracting the phase that yields the variation. For the example above, the phase of each fringe number in the images can be calculated using a four-step phase shift method given by Equation 2 below, wherein the phase difference $\Phi(x,y)$ between a and b and between c and d are the same and calculated for each $N_j$:

$$\Phi_j(x, y) = \arctan\left[\frac{I_{a,j}(x, y) - I_{b,j}(x, y)}{I_{c,j}(x, y) - I_{d,j}(x, y)}\right] \quad (2)$$

In some embodiments, Equation 2 can be modified to simultaneously account for three images, five images, or more images. The phase difference $\Phi_j$ (x,y) can be unwrapped from a lower frequency pattern to a higher frequency pattern. For example, the phase difference can be unwrapped from a phase difference corresponding to a least value of $N_j$ to an unwrapped phase difference $\Phi_n^{unwrap}$ (x,y), which corresponds to a greatest value of $N_j$. In some embodiments, the unwrapped phase difference $\Phi_n^{unwrap}$ (x,y) can be determined using Equation 3 below, wherein expressions inside the brackets "⟨ ⟩" are rounded to a closest integer and n is the nth frequency of the fringe:

$$\Phi_n^{unwrap}(x, y) = \Phi_n(x, y) + 2\pi\left\langle\frac{\Phi_{n-1}^{unwrap}(x, y)\frac{N_n}{N_{n-1}} - \Phi_n(x, y)}{2\pi}\right\rangle \quad (3)$$

In some embodiments, a system can use the unwrapped phase $\Phi_n^{unwrap}(x,y)$ to determine a depth at a pixel location in the image at the position (x,y) using Equation 4 below, wherein ƒ( ) is a rational expression with polynomial coefficients in the numerator and denominator determined by the geometry of the light source, camera, and illuminated surface:

$$Z = f(x, y, xy, x^2, y^2, \Phi_n^{unwrap}) \quad (4)$$

In some embodiments, the x and y positions can be taken from an illuminated two-dimensional (2D) image. A system can perform the calculation using Equation 4 above for each available 2D position in the illuminated 2D image to determine a corresponding 3D feature position for each of the 2D positions. The 3D feature positions can be combined to generate a 3D geometry of the feature, wherein the 3D geometry can also include a tracing, interpolation, or curve fitting of the calculated 3D feature positions. Alternatively, instead of or in addition to the function ƒ( ) shown in Equation 4, the pixel location in the image at a position (x,y) and its corresponding depth z can also be mapped to a corresponding physical location (x', y', z') using geometric, trigonometric, or polynomial relations or equations.

In some embodiments, the operations using Equations 1-4 can be performed for multiple images. After performing the operations above using multiple images, the resulting 3D position information of the multiple images for a same feature can be combined using a weighted average, convolution function, or other analysis method. For example, after determining a feature shape and matching different 2D positions on different images to a same feature position, the 3D feature position values calculated from each of the different images can be averaged to determine an average depth value at that feature position. In addition, while a cartesian coordinate system was used, other systems can perform the above calculations in other coordinate systems such as a polar coordinate system, spherical coordinate system, hyperbolic coordinate system, etc.

In some embodiments, the system can process the images downhole using a processor in the SI tool or in another tool in the borehole to determine a 3D position of the feature. In some embodiments, the 3D position information can be the depth information corresponding to one or more features detected in image data. In some embodiments, the system can send the depth information to the surface and/or store the depth information on the tool. Alternatively, the SI tool can send image data acquired by the one or more cameras to the surface through a variety of telemetry systems such as an electric telemetry system, acoustic telemetry system, fiber optic telemetry system, etc.

At block 924, the system determines one or more additional properties such as a chemical presence based on the one or more images. In some embodiments, one or more light patterns used to illuminate a feature can include one or more colors. In a subsurface environment, materials can respond to different light colors with different degrees of reflectivity and/or fluorescence. In some embodiment, the images of features illuminated by the light pattern(s) can be analyzed to determine what visual features are visible based on the light transmitted. For example, a first image can include a feature illuminated by red light and a second image can include the same feature illuminated by green light. A comparison of these images can result in a determination that the formation includes a chemical composition such as limestone or shale, or that a tool being retrieved has a particular color.

At block 928, the system can modify a well operation based on the 3D feature position. In some embodiments, the well operation can be a fishing operation to retrieve a target component from the well. The 3D position determined using the operations above can be used to determine the depth of the feature. In response, an arm or other component of the fishing tool used in a fishing operation can be used to determine how far to extend the arm or other component of the fishing tool, or when to engage the arm. As another example, the well operation can be a stimulation operation, and the system can stop the stimulation operation based on a determination that a section of the borehole was experiencing physical degradation by the stimulation treatment, wherein the determination is based on one or more operations of the flowchart 900. Once the system modifies the well operation, the operations of the flowchart 900 can be complete.

Example Computer

Figure 10:
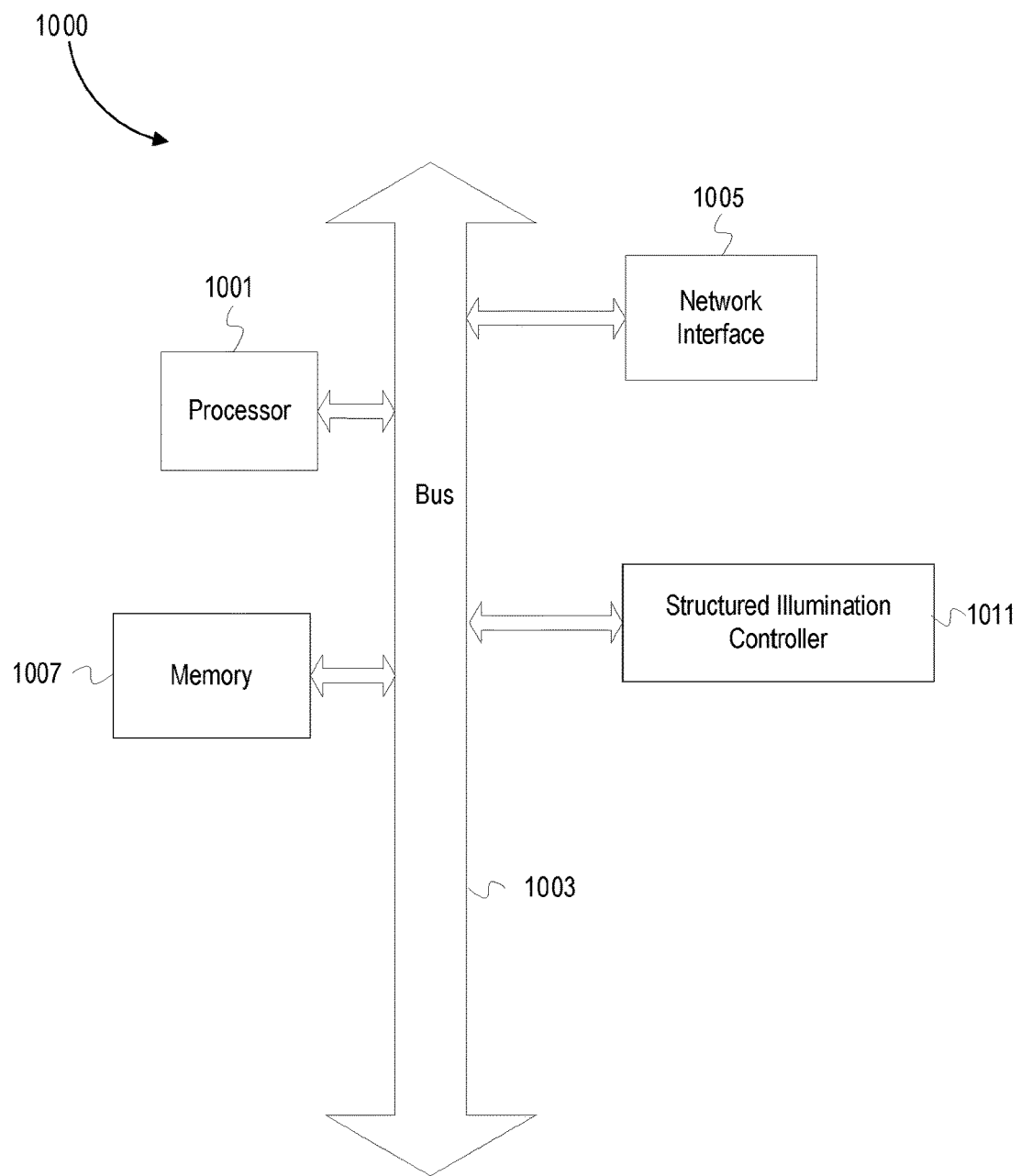
FIG. 10 is a schematic diagram of an example computer device.

FIG. 10 is a schematic diagram of an example computer device. A computer device 1000 includes a processor 1001 (possibly including multiple processors, multiple cores, multiple nodes, and/or implementing multi-threading, etc.). With respect to FIG. 1 and FIG. 2, the computer device 1000 can be a part of surface system 129, surface system 255, and/or the SI tool 250, and the processor 1001 can be similar to or identical to the processor 130, the processor 256, and/or the processor 252. The computer device 1000 includes a memory 1007. The memory 1007 can be system memory. For example, the memory 1007 can include one or more of cache, SRAM, DRAM, zero capacitor RAM, Twin Transistor RAM, eDRAM, EDO RAM, DDR RAM, EEPROM, NRAM, RRAM, SONOS, PRAM, etc. or any one or more of the above already described possible realizations of machine-readable media. The computer device 1000 also includes a bus 1003. For example, the bus 1003 can include a PCI, ISA, PCI-Express, HyperTransport® bus, InfiniBand® bus, NuBus, etc. The system can also include a network interface 1005. For example, the network interface 1005 can include a Fiber Channel interface, an Ethernet interface, an internet small computer system interface, SONET interface, wireless interface, etc.

The computer device 1000 includes a structured illumination controller 1011. The structured illumination controller 1011 can perform any one or more of the operations described above. For example, the structured illumination controller 1011 can activate one or more light sources in the set of light sources and/or activate and control one or more filter masks. Additionally, in some embodiments, the structured illumination controller 1011 can control other components of the SI tool and/or modify additional operational parameters during a well operation.

Any one of the previously described functionalities can be partially (or entirely) implemented in hardware and/or on the processor 1001. For example, the functionality can be implemented with an application specific integrated circuit, in logic implemented in the processor 1001, in a co-processor on a peripheral device or card, etc. Further, realizations can include fewer or additional components not illustrated in FIG. 10. For example, the computer device 1000 can include one or more video cards, audio cards, additional network interfaces, peripheral devices, etc. The processor 1001 and the network interface 1005 are coupled to the bus 1003. Although illustrated as being coupled to the bus 1003, the memory 1007 can be coupled to the processor 1001. The computer device 1000 can be a device at the surface and/or integrated into component(s) in the borehole.

As will be appreciated, aspects of the disclosure can be embodied as a system, method or program code/instructions stored in one or more machine-readable media. Aspects can take the form of hardware, software (including firmware, resident software, micro-code, etc.), or a combination of software and hardware aspects that can all generally be referred to herein as a "circuit" or "system." The functionality presented as individual units in the example illustrations can be organized differently in accordance with any one of platform (operating system and/or hardware), application ecosystem, interfaces, programmer preferences, programming language, administrator preferences, etc.

Any combination of one or more machine readable medium(s) can be utilized. The machine-readable medium can be a machine-readable signal medium or a machine-readable storage medium. A machine-readable storage medium can be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium can be any tangible medium that can contain, or store a program for use by or in connection with an instruction execution system, apparatus, or device. A machine-readable storage medium is not a machine-readable signal medium.

A machine-readable signal medium can include a propagated data signal with machine readable program code embodied therein, for example, in baseband or as part of a carrier wave. Such a propagated signal can take any of a variety of forms, including, but not limited to, electromagnetic, optical, or any suitable combination thereof. A machine-readable signal medium can be any machine readable medium that is not a machine-readable storage medium and that can communicate, propagate, or transport a program for use by or in connection with an instruction execution system, apparatus, or device.

Program code embodied on a machine-readable medium can be transmitted using any appropriate medium, including but not limited to wireless, wireline, optical fiber cable, RF, etc., or any suitable combination of the foregoing.

Computer program code for carrying out operations for aspects of the disclosure can be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code can execute entirely on a stand-alone machine, can execute in a distributed manner across multiple machines, and can execute on one machine while providing results and or accepting input on another machine.

Additional Terminology and Variations

The program code/instructions can also be stored in a machine-readable medium that can direct a machine to function in a particular manner, such that the instructions stored in the machine-readable medium produce an article of manufacture including instructions which implement the function/act specified in the flowchart and/or block diagram block or blocks.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed. A set of items can have only one item or more than one item. For example, a set of numbers can be used to describe a single number or multiple numbers. In the context of this application, an "image" can be any image data, representation of image data, or visualization of image data that can be transformed into a representation of an optical measurement. For example, a 1500 by 500 pixel file wherein each pixel of the pixel file has an assigned brightness value can be an image.

Additional potential light patterns can include sequential projection patterns such as binary code patterns, gray code patterns, phase shift patterns, hybrid patterns comprising of gray code patterns and phase shift patterns. Additional potential light patterns can also include continuous varying patterns such as a rainbow 3D pattern and a continuously varying color code pattern. Furthermore, the light patterns can also include strip indexing patterns such as color coded stripes, segmented stripes, gray scale coded stripes, and de Brujin sequence patterns. In some embodiments, the light patterns can also include grid-indexing patterns such as pseudo-random binary-dots, mini-pattern codewords, color-coded grid, and two-dimensional (2D) color coded dot array.

Example Embodiments

Example embodiments include the following:

Embodiment 1: An apparatus comprising: a tool body; a structured illumination device attached to the tool body, wherein the structured illumination device comprises a light source and a light filter mask to generate a light pattern; a subsurface camera system attached to the tool body, wherein the subsurface camera system comprises a plurality of cameras; a processor; and a machine-readable medium having program code executable by the processor to cause the apparatus to, acquire an image of a feature using the subsurface camera system, wherein the feature is illuminated by the light pattern, and determine a three-dimensional position of the feature based on the image.

Embodiment 2: The apparatus of Embodiment 1, wherein the light filter mask comprises a set of spaced components, wherein a first spacing between a first pair of spaced components of the light filter mask is different from a second spacing between a second pair of spaced components.

Embodiment 3: The apparatus of Embodiments 1 or 2, wherein the plurality of cameras comprises at least one of a plurality of circumferentially distributed cameras and a rotating camera second spacing is at least double the length of the first spacing.

Embodiment 4: The apparatus of any of Embodiments 1-3, wherein the light filter mask comprises a plurality of rings, wherein the plurality of rings are substantially co-axial with the tool body.

Embodiment 5: The apparatus of any of Embodiments 1-4, wherein the structured illumination device is angled to transmit the light pattern at an angle greater than 5 degrees relative to a line between a camera of the subsurface camera system and the feature.

Embodiment 6: The apparatus of any of Embodiments 1-5, wherein the light source comprises a multi-colored light source.

Embodiment 7: The apparatus of any of Embodiments 1-6, wherein the light pattern comprises a first light pattern having a first color, and wherein the structured illumination device comprises a second light source to generate a second light pattern having a second color.

Embodiment 8: The apparatus of any of Embodiments 1-7, wherein the plurality of cameras comprises a plurality of circumferentially distributed cameras, and wherein the plurality of circumferentially distributed cameras comprises a first camera facing a first direction and a second camera facing a second direction, wherein the first direction and second direction are at different directions to each other.

Embodiment 9: The apparatus of any of Embodiments 1-8, wherein the image of the feature is a first image, and wherein the program code includes instructions to: acquire a second image of the feature using the subsurface camera system; and determine a three-dimensional position of the feature based on the first image and the second image.

Embodiment 10: The apparatus of any of Embodiments 1-9, wherein the camera system includes a camera positioned at an end of the tool body and facing away from the tool body.

Embodiment 11: A method comprising: lowering a tool body into a borehole, wherein a structured illumination device is attached to the tool body, and wherein the structured illumination device comprises a light source and a light filter mask, and wherein a subsurface camera system is attached to the tool body, and wherein the subsurface camera system comprises a plurality of cameras; illuminating a feature using a light pattern generated by the structured illumination device; acquiring an image of the feature using the subsurface camera system; and determining a three-dimensional position of the feature based on the image.

Embodiment 12: The method of Embodiment 11, wherein the image is a first image, and wherein the light pattern is a first light pattern, and wherein the method further comprises: generating a second light pattern, wherein the second light pattern is different from the first light pattern; acquiring a second image of the feature based on the second light pattern; and determining the three-dimensional position of the feature based on the first image and the second image.

Embodiment 13: The method of Embodiments 11 or 12, wherein the light pattern has a first region and a second region, wherein the first region and the second region differ by at least one of a color, an optical phase delay, and a polarization.

Embodiment 14: The method of any of Embodiments 11-13, wherein the light source is part of a set of circumferentially distributed light sources, and wherein the light pattern is generated by the set of circumferentially distributed light sources.

Embodiment 15: The method of any of Embodiments 11-14, wherein illuminating the feature comprises transmitting the light pattern towards the feature at an angle greater than 5 degrees relative to a line between a camera of the subsurface camera system and the feature.

Embodiment 16: The method of any of Embodiments 11-15, wherein the light pattern comprises at least two colors.

Embodiment 17: A well system comprising: a conveyance in a borehole; a tool body attached to the conveyance; a structured illumination device attached to the tool body, wherein the structured illumination device comprises a light source and a light filter mask to generate a light pattern; a subsurface camera system attached to the tool body, wherein the subsurface camera system comprises a plurality of cameras; a processor; and a machine-readable medium having program code executable by the processor to cause the well system to, acquire an image of a feature in the borehole using the subsurface camera system, wherein the feature is illuminated by the light pattern, and determine a three-dimensional position of the feature based on the image.

Embodiment 18: The well system of Embodiment 17, wherein the light filter mask comprises a set of spaced components, wherein a first spacing between a first pair of spaced components of the light filter mask is different from a second spacing between a second pair of spaced components.

Embodiment 19: The well system of Embodiments 17 or 18, wherein the light filter mask comprises a plurality of rings, wherein the plurality of rings are substantially co-axial with the tool body.

Embodiment 20: The well system of any of Embodiments 17-19, wherein the structured illumination device is angled to transmit the light pattern towards the feature at an angle greater than 5 degrees relative to a line between a camera of the subsurface camera system and the feature.

Embodiment 21: The well system of any of Embodiments 17-20, wherein the light pattern comprises a first light pattern having a first color, and wherein the structured illumination device comprises a second light source to generate a second light pattern having a second color.

Embodiment 22: The well system of any of Embodiments 17-21, wherein the conveyance is a coiled tubing.

What is claimed is:

1. An apparatus comprising:
   a tool body;
   a structured illumination device attached to the tool body, wherein the structured illumination device comprises a light source and a light filter mask to generate a light pattern, wherein the light filter mask comprises a first filter ring comprising a first set of spaced components and a second filter ring comprising a second set of spaced components, the first filter ring overlaid and concentric with the tool body, the second filter ring coaxial with the first filter ring and configured so that light from the light source passes through the first filter ring and then through the second filter ring to generate the light pattern;
   a subsurface camera system attached to the tool body, wherein the subsurface camera system comprises a plurality of cameras;
   a processor; and
   a machine-readable medium having program code executable by the processor to cause the apparatus to,
      based on illumination of a feature by the light pattern, acquire an image of the feature using the subsurface camera system;
      and
      determine a three-dimensional position of the feature based on the image.

2. The apparatus of claim 1, wherein a first spacing between the first set of spaced components of the light filter mask is different from a second spacing between the second set of spaced components.

3. The apparatus of claim 2, wherein the plurality of cameras comprises at least one of a plurality of circumferentially distributed cameras and a rotating camera, and wherein the second spacing is at least double the length of the first spacing.

4. The apparatus of claim 1, wherein the light filter mask comprises at least two filter rings, wherein one or more of the at least two filter rings are rotatable to provide a plurality of different light patterns for the light from the light source passing through the filter mask and used to generate the light pattern.

5. The apparatus of claim 1, wherein the structured illumination device is angled to transmit the light pattern at an angle greater than 5 degrees relative to a line between a camera of the subsurface camera system and the feature.

6. The apparatus of claim 1, wherein the light source comprises a multi-colored light source.

7. The apparatus of claim 1, wherein the light pattern comprises a first light pattern having a first color, and wherein the structured illumination device comprises a second light source to generate a second light pattern having a second color.

8. The apparatus of claim 1, wherein the plurality of cameras comprises a plurality of circumferentially distributed cameras, and wherein the plurality of circumferentially distributed cameras comprises a first camera facing a first direction and a second camera facing a second direction, wherein the first direction and second direction are at different directions to each other.

9. The apparatus of claim 1, wherein the image of the feature is a first image, and wherein the program code includes instructions to:
   acquire a second image of the feature using the subsurface camera system; and
   determine the three-dimensional position of the feature based on the first image and the second image.

10. The apparatus of claim 1, wherein the subsurface camera system includes a camera positioned at an end of the tool body and facing away from the tool body.

11. A method comprising:
   lowering a tool body into a borehole, wherein a structured illumination device is attached to the tool body, and wherein a subsurface camera system is attached to the tool body, and wherein the subsurface camera system comprises a plurality of cameras;

based on generating a light pattern by filtering light generated by a light source through a light filter mask, illuminating a feature with the light pattern, wherein the light filter mask comprises a first filter ring comprising a first set of spaced components and a second filter ring comprising a second set of spaced components, the first filter ring overlaid and concentric with the tool body, the second filter ring coaxial with the first filter ring, and wherein generating the light pattern includes passing light from the light source through the first filter ring and then through the second filter ring;

capturing an image of the feature illuminated by the light pattern using the subsurface camera system; and determining a three-dimensional position of the feature based on the image.

12. The method of claim 11, wherein the image is a first image, and wherein the light pattern is a first light pattern, and wherein the method further comprises:

generating a second light pattern, wherein the second light pattern is different from the first light pattern;

capturing a second image of the feature illuminated by the second light pattern; and determining the first depth based on combining the first image and the second image.

13. The method of claim 11, wherein the light pattern has a first region and a second region, wherein the light pattern comprises at least two colors, and wherein the first region and the second region differ by at least one of a color, an optical phase delay, and a polarization.

14. The method of claim 11, wherein the light source is part of a set of circumferentially distributed light sources, and wherein generating the light pattern comprises generating the light pattern by the set of circumferentially distributed light sources.

15. The method of claim 11, wherein illuminating the feature comprises transmitting the light pattern towards the feature at an angle greater than 5 degrees relative to a line between a camera of the subsurface camera system and the feature.

16. The method of claim 11, further comprising:

rotating one or both of the first filter ring and the second filter ring relative to one another to generate a plurality of different light patterns for the light from the light source passing through the light filter mask.

17. A well system comprising:

a conveyance in a borehole;

a tool body attached to the conveyance;

a structured illumination device attached to the tool body, wherein the structured illumination device comprises a light source and a light filter mask to generate a light pattern, wherein the light filter mask comprises at least one of a set of spaced components and a plurality of rings, wherein a first spacing between a first pair of spaced components of the light filter mask is different from a second spacing between a second pair of spaced components, and wherein the plurality of rings are substantially co-axial with the tool body;

a subsurface camera system attached to the tool body, wherein the subsurface camera system comprises a plurality of cameras;

a processor; and a machine-readable medium having program code executable by the processor to cause the well system to, based on illumination of a feature in the borehole by the light pattern, acquire an image of the feature using the subsurface camera system;

determine a first depth between a surface of the feature and the light source based on analysis of distortions in the light pattern illuminating the feature that are recorded in the image; and determine a three-dimensional position of the feature based on the first depth.

18. The well system of claim 17, wherein the structured illumination device is angled to transmit the light pattern towards the feature at an angle greater than 5 degrees relative to a line between a camera of the subsurface camera system and the feature.

19. The well system of claim 17, wherein the light pattern comprises a first light pattern having a first color, and wherein the structured illumination device comprises a second light source to generate a second light pattern having a second color.

20. The well system of claim 17, wherein the conveyance is a coiled tubing.

* * * * *